(12) United States Patent
Hosoi (10) Patent No.: US 6,740,897 B2
(45) Date of Patent: May 25, 2004

(54) RADIATION IMAGE STORAGE PANEL AND PROCESS FOR READING RADIATION IMAGE INFORMATION

(75) Inventor: Yuichi Hosoi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/014,787

(22) Filed: Dec. 14, 2001

(65) Prior Publication Data

US 2002/0104974 A1 Aug. 8, 2002

(30) Foreign Application Priority Data

Dec. 14, 2000 (JP) .......................................... 2000-379650

(51) Int. Cl.[7] .............................................. G03B 42/02
(52) U.S. Cl. ...................... 250/584; 250/484.4; 250/367
(58) Field of Search ............................... 250/584, 484.4, 250/367, 368

(56) References Cited

U.S. PATENT DOCUMENTS

| | | | | |
|---|---|---|---|---|
| 3,917,950 A | * | 11/1975 | Carlson | 250/483.1 |
| 4,649,280 A | * | 3/1987 | Holland et al. | 250/483.1 |
| 4,982,096 A | * | 1/1991 | Fujii et al. | 250/367 |
| 5,103,099 A | * | 4/1992 | Bourdinaud et al. | 250/368 |
| 5,281,820 A | * | 1/1994 | Groh et al. | 250/368 |
| 6,507,032 B1 | * | 1/2003 | Hell et al. | 250/484.4 |
| 6,531,225 B1 | * | 3/2003 | Homme et al. | 428/408 |

* cited by examiner

*Primary Examiner*—Christopher W. Fulton
(74) *Attorney, Agent, or Firm*—Sughrue Mion, PLLC

(57) ABSTRACT

In a radiation image storage panel composed of a support sheet and a phosphor layer formed on a surface of the support sheet by vapor-accumulating method, the phosphor layer is composed of prismatic crystals of phosphor aligned in the same direction, and each of the crystals has a convex surface at one end. The radiation image storage panel is favorably employed in combination with a line sensor in a radiation image recording and reproducing method.

11 Claims, 5 Drawing Sheets

SEM Pictures of Phosphor Layer Surface (1)

×2000

10 μm (2)

×10000

1 μm

RADIATION IMAGE STORAGE PANEL AND PROCESS FOR READING RADIATION IMAGE INFORMATION

FIELD OF THE INVENTION

The present invention relates to a radiation image storage panel favorably employable in a radiation image recording and reproducing method utilizing stimulated emission. The invention also relates to a process for reading radiation image information stored in the radiation image storage panel.

BACKGROUND OF THE INVENTION

When a stimulable phosphor is exposed to a radiation such as X-ray, it absorbs and stores a portion of the radiation energy. The stimulable phosphor then emits stimulated emission according to the level of the stored energy when the phosphor is exposed to an electromagnetic wave such as visible light or infrared rays (i.e., stimulating ray).

A radiation image recording and reproducing method utilizing the stimulable phosphor has been widely employed practically. The method employs a radiation image storage panel comprising the stimulable phosphor, and comprises the steps of causing the stimulable phosphor of the storage panel to absorb radiation energy having passed through an object or having radiated from an object; sequentially exciting the stimulable phosphor with a stimulating ray such as a laser beam to emit a stimulated emission; and photoelectrically detecting the emitted light to obtain electric signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as stimulable phosphor sheet) has a basic structure comprising a support and a stimulable phosphor layer provided thereon. On the free surface (surface not facing the support) of the phosphor layer, a protective film is generally placed to keep the phosphor layer from chemical deterioration or physical damage.

The stimulable phosphor layer usually comprises a binder and stimulable phosphor particles dispersed therein, but it may consist of agglomerated phosphor without binder.

In U.S. patent application Ser. No. 09/749,623, a modified radiation image recording and reproducing method is described. In the method, a function for absorbing radiation and a function for storing the radiation energy are separated, while a stimulable phosphor used in the known radiation image recording and reproducing method performs both functions. For that purpose, a radiation image storage panel comprising at least a stimulable phosphor (for storage) and a fluorescent screen comprising a fluorescent phosphor which absorbs radiation and emits ultraviolet or visible light are used in combination. The method comprises the steps of exposing the fluorescent screen to a radiation having passed through an object or having radiated from an object and converting the radiation into ultraviolet or visible light by the fluorescent phosphor; having the ultraviolet or visible light absorbed by the stimulable phosphor; sequentially scanning a stimulating ray on the stimulable phosphor of the storage panel to emit a stimulated emission; and photoelectrically detecting the emitted light to obtain electric signals of the radiation image. The radiation image storage panel of the present invention can be employed in the method of U.S. Ser. No. 09/749,623.

A modified process for reading radiation image information in the form of a simulated emission is also proposed so as to shorten the time for reading, to manufacture a small-sized apparatus and to reduce the manufacturing cost. In the proposed process, the radiation image is divided into pixels by a photodetector (such as a two-dimensional solid image pick-up device or a semiconductor line sensor) to obtain a time-dependent series of image signals through an electric circuit. Japanese Patent Publication No. 5-32945 describes an apparatus for a process comprising the steps of exposing a radiation image storage panel to stimulating rays having emitted from a light source (e.g., a fluorescent lamp) through a slit for linearly stimulating the storage panel (i.e., line stimulation), and detecting the stimulated emission having emitted from the storage panel by a line sensor comprising many photoelectric converting elements (i.e., line detection). The line sensor is placed so that it can face the stimulating rays-exposed area of the storage panel.

In the radiation image recording and reproducing method (and the process for reading radiation image information) described above, the obtained image signals can be subjected to various image-processing so that a sufficient amount of image information can be obtained by applying a small dose of radiation. Further, since the radiation image storage panel can be repeatedly used, the method is also advantageous from the viewpoint of conservation of resources and economic efficiency.

It is desired that radiation image storage panels used in these methods have sensitivity as high as possible and to provide an image of as high quality (e.g., high sharpness, high graininess) as possible.

For improving the sensitivity and the image quality, some methods have been already proposed. For example, Japanese Patent Publication No. 7-27078 describes a radiation image information reading apparatus for the process using a radiation image storage panel having a stimulable phosphor layer formed by vapor-accumulating method. The stimulable phosphor layer in the panel is composed of prismatic blocks sectioned with cracks. The stimulating rays are applied on one face of the storage panel, and the stimulated emission emitting from the same surface is detected by a photoelectric converter. Further, Japanese Patent Provisional Publication No. 62-47600 proposes a method in which a stimulable phosphor layer of radiation image storage panel is formed by electron beam-evaporating method (which is a kind of vapor deposition method). In the method, an electron beam generated by an electron gun is applied onto a stimulable phosphor or starting materials thereof (vapor source) to vaporize the source, to scatter and to deposit the vapor on the surface of the support. Thus formed phosphor layer consists of prismatic crystals of the stimulable phosphor. Generally, a phosphor layer formed by vapor deposition method such as electron beam-evaporating method comprises only a stimulable phosphor with no binder, and in the phosphor layer there are cracks among the prismatic crystals of the stimulable phosphor. For this reason, the stimulating rays are efficiently applied to the phosphor and the stimulated emission are also efficiently taken out. Hence, a radiation image of high sharpness can be obtained with high sensitivity.

In the case where the phosphor layer is formed on the support by vapor deposition method such as electron beam-evaporating method, formed prismatic phosphor crystals have growing open ends (top ends not facing to the support) that usually have flat surfaces or various complex surfaces (mixture of flat, concave and convex surfaces). The present inventor has found that, if the end (top) of each prismatic crystal has a flat or concave surface, the stimulated emission is diffused when it comes out from the surface of the phosphor layer, even though the stimulating rays and the stimulated emission are not diffused in the phosphor layer of the prismatic phosphor crystals. In that case, even if photoelectric converters receive the emission through a light-collecting optical system, the emission is so diffused as to lower the light-collecting efficiency. Consequently, the sensitivity and the image quality such as sharpness are impaired.

SUMMARY OF THE INVENTION

An object of the present invention is to provide a radiation image storage panel which is improved in sensitivity and collecting efficiency of stimulated emission.

Another object of the invention is to provide a process for reading radiation image information, by which a radiation image of high quality can be rapidly obtained with high sensitivity.

The present invention resides in a radiation image storage panel comprising a support sheet and a phosphor layer formed on a surface of the support sheet by vapor-accumulating method, wherein the phosphor layer comprises prismatic crystals of phosphor aligned in the same direction, and each of the crystals has a convex surface at one end.

Here, "each of the crystals has a convex surface at one of the ends" means that not less than 95% of the prismatic crystals have convex ends.

Preferred embodiments of the radiation image storage panel are as follows.

(1) The radiation image storage panel wherein the phosphor is stimulable phosphor.

(2) The radiation image storage panel, wherein the crystal has a convex surface at the end not facing the surface of the support.

(3) The radiation image storage panel wherein the support is a transparent support, and the crystal has a convex surface at the end facing the surface of the support.

(4) The radiation image storage panel wherein the convex surface is a spherical surface.

(5) The radiation image storage panel wherein the prismatic crystals of phosphor are aligned perpendicularly to the surface of the support.

The invention also resides in a process for preparing a radiation image storage panel, comprising applying electron beams to a stimulable phosphor source to vaporize the phosphor source and depositing the vapor of the phosphor source on the surface of the support, in which the electron beams are gradually reduced in their energy just before the deposition is complete.

The invention further resides in a process for reading radiation image information comprising the steps of:

moving in one direction the radiation image storage panel of claim 3 on which radiation image information is recorded and stored, in relation to a line sensor which comprises plural photoelectric converting elements arranged linearly and which is placed over the convex surfaces of the aligned prismatic phosphors of the storage panel on a line extending from the end of the convex surface of the aligned prismatic crystal in the same direction, under such condition that the line sensor moves on a plane parallel to the storage panel, while the phosphor layer of the storage panel is scanned with stimulating rays in a direction which is different from the direction of the movement of the storage panel and the stimulating rays are applied onto the phosphor layer approximately parallel to the aligning direction of the prismatic phosphor crystals in the phosphor layer;

detecting an emission emitting from the phosphor layer of the storage panel by the line sensor, so as to photoelectrically convert the emission to an electric signal;

detecting an electric signal of the movement of the storage panel in relation to the line sensor; and comparing the signal of the emission and the signal of the movement of the storage panel to produce a radiation image information in the form of electric signals.

The invention furthermore resides in a process for reading radiation image information, comprising the steps of:

moving in one direction the radiation image storage panel of claim 4 on which radiation image information is recorded and stored, in relation to a line sensor which comprises plural photoelectric converting elements arranged linearly and which is placed below the support of the storage panel on a line extending from the end of the convex surface of the aligned prismatic crystal in the same direction, under such condition that the line sensor moves on a plane parallel to the storage panel, while the phosphor layer of the storage panel is scanned with stimulating rays in a direction which is different from the direction of the movement of the storage panel and the stimulating rays are applied onto the phosphor layer approximately parallel to the aligning direction of the prismatic phosphor crystals in the phosphor layer;

detecting an emission emitting from the phosphor layer of the storage panel by the line sensor, so as to photoelectrically convert the emission to an electric signal;

detecting an electric signal of the movement of the storage panel in relation to the line sensor; and comparing the signal of the emission and the signal of the movement of the storage panel to produce a radiation image information in the form of electric signals.

BRIEF DESCRIPTION OF DRAWINGS

Each of FIG. 2 (1) and (2) is a schematic sectional view showing the stimulated emission coming out from the end of the prismatic crystal in the radiation image storage panel of the invention or in a known radiation image storage panel, respectively.

Each of FIG. 3 (1) to (5) is a sectional view showing a shape of the end of prismatic crystal according to the invention.

Each of FIG. 9 (1) and (2) is an electromicroscopXpic image showing shapes of the ends of prismatic crystals according to the invention.

DETAILED DESCRIPTION OF THE INVENTION

The constitution of a radiation image storage panel of the invention is explained below by referring to the attached drawings.

Figure 1:
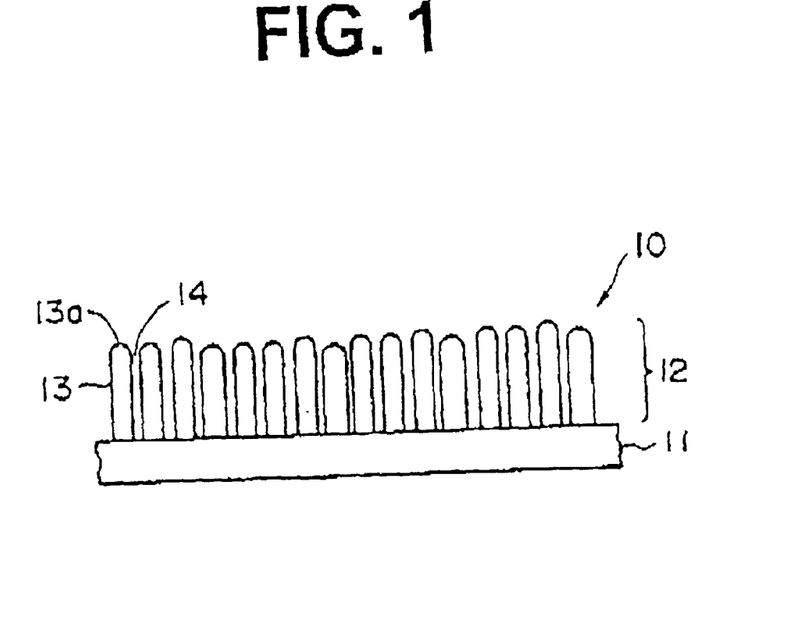
FIG. 1 is a schematic sectional view showing constitution of a radiation image storage panel of the invention.
Figure 2:
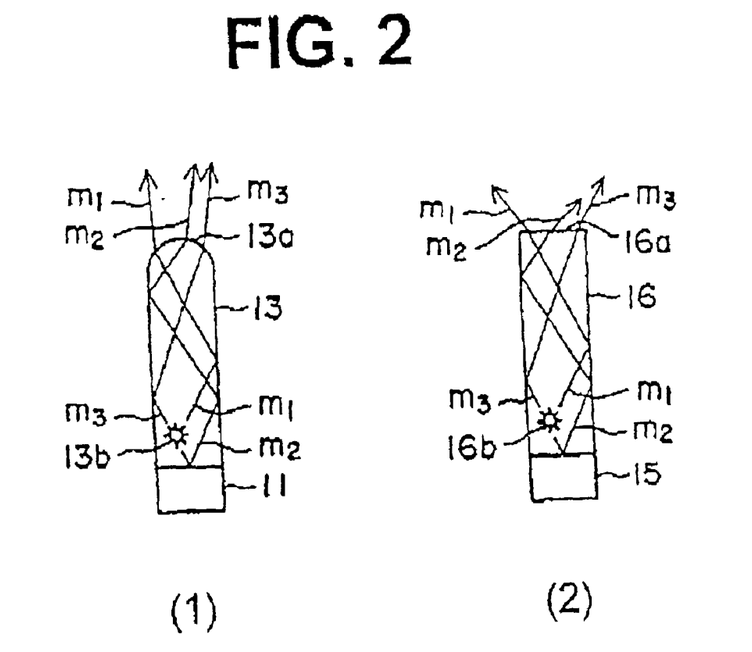

FIG. 1 is a partial sectional view schematically showing constitution of a radiation image storage panel of the invention. In FIG. 1, the radiation image storage panel 10 comprises a support 11 and a phosphor layer 12. The phosphor layer 12 comprises a number of prismatic phosphor crystals 13, and among the prismatic crystals 13 there are cracks 14. The prismatic crystals 13 are aligned perpendicularly to the surface of the support 11, and each of them has a convex end (top) 13a.

Each prismatic crystal 13 generally has a width of 1 to 100 μm. The height of each prismatic crystal 13 (namely, the thickness of the phosphor layer 12) is generally in the range of 50 to 1,000 μm, preferably in the range of 200 to 700 μm. The width of each crack 14 is generally in the range of 0 to 10 μm.

FIG. 2 (1) and (2) are schematic sectional views showing the stimulated emission coming out from the end of prismatic crystal. The prismatic crystal 13 in FIG. 1 according to the invention and a conventional prismatic crystal are shown in FIG. 2-(1) and -(2), respectively.

In FIG. 2-(1), the stimulated emission ($m_1$, $m_2$ or $m_3$) is generated at a certain point 13b in the prismatic crystal 13 of the invention provided on the support 11. The emission then travels in all directions, but in any direction the emission of the stimulated emission is repeatedly reflected by the support 11 or by the interface between the prismatic crystal 13 and air (in the crack), and consequently the emission reaches the end 13a. Since the end 13a has a spherical surface, almost all of the emissions ($m_1$, $m_2$ and $m_3$) come out of the end 13a perpendicularly or nearly perpendicularly to the support 11.

In FIG. 2-(2), the stimulated emission ($m_1$, $m_2$ or $m_3$) is generated at a point 16b (corresponding to the point 13b in FIG. 2 (1)) in a conventional prismatic crystal 16 provided on the support 15. The emission then travels in all directions, and is repeatedly reflected by the support 15 or by the interface between the prismatic crystal 16 and air (the crack) to reach the end 16a. Since the end 16a has a flat surface, the emissions ($m_1$, $m_2$ and $m_3$) come out of the end 16a in various directions and consequently the stimulated emission is diffused.

As described above, since the prismatic crystal according to the invention has a convex end surface, an increased amount of the stimulated emission comes out of the prismatic crystal (i.e., the phosphor layer) in the aligning direction (perpendicularly, in the above case).

Figure 3:
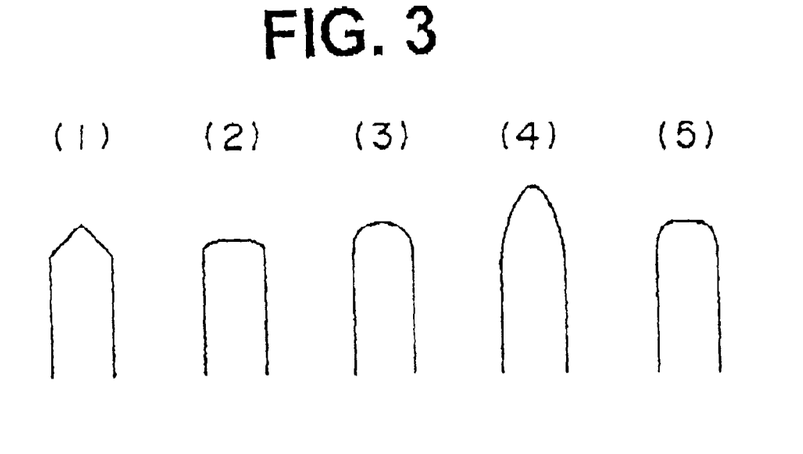

The end 13a of the prismatic crystal 13 preferably has a spherical surface, as shown in FIG. 2-(1). However, as long as the end has a convex surface, any shapes (like shown in FIG. 3) can be used.

Each of FIG. 3-(1) to -(5) is a sectional view showing a shape of the end of prismatic crystal according to the invention. FIG. 3-(1) shows a conical end, FIG. 3-(2) to -(4) show spherical ends having various radiuses, and FIG. 3-(5) shows a spherical end having a flat top.

It is not necessary that the prismatic crystals 13 of the phosphor be aligned perpendicularly to the support, as shown in FIG. 1, in the radiation image storage panel of the invention. The crystals may be aligned obliquely at a certain angle to the perpendicular direction. The angle is preferably within the range of ±45°.

Figure 4:
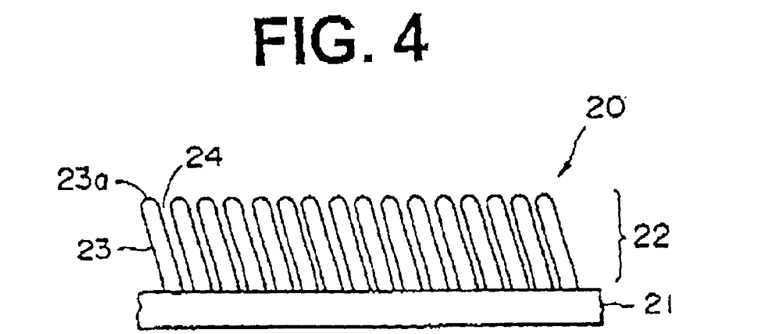
FIG. 4 is a schematic sectional view showing constitution of another radiation image storage panel of the invention.

FIG. 4 is a partial sectional view schematically showing constitution of another radiation image storage panel of the invention. In FIG. 4, the radiation image storage panel 20 comprises a support 21 and a phosphor layer 22. The phosphor layer 22 comprises a number of prismatic phosphor crystals 23, and among the prismatic crystals 23 there are produced cracks 24. The prismatic crystals 23 are aligned obliquely to the support 21, and each of them has a convex end (top) 23a.

Figure 5:
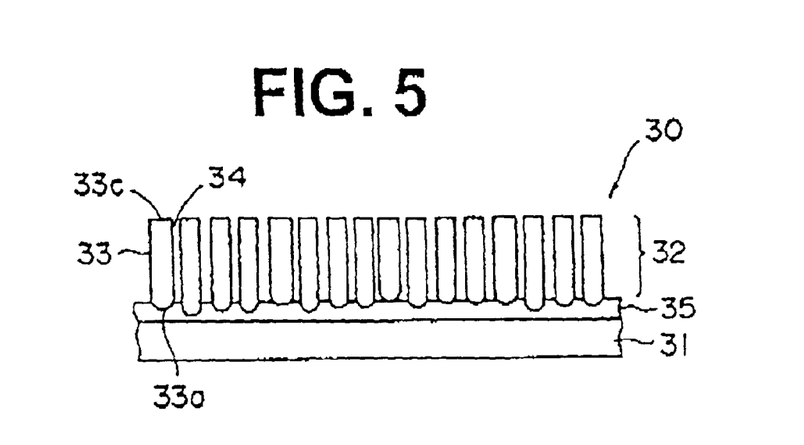
FIG. 5 is a schematic sectional view showing constitution of another radiation image storage panel of the invention.

Otherwise, the radiation image storage panel of the invention may have the constitution shown in FIG. 5.

FIG. 5 is a partial sectional view schematically showing the constitution of a different radiation image storage panel according to the invention. In FIG. 5, the radiation image storage panel 30 comprises a transparent support 31, an adhesive layer 35 and a phosphor layer 32. The phosphor layer 32 comprises a number of prismatic phosphor crystals 33, and among the prismatic crystals 33 there are produced cracks 34. The prismatic crystals 33 are aligned perpendicularly to the support 31, and each of them has a convex end (bottom) 33a on the support side and a flat end (top) 33c on the opposite side.

When radiation image information is read out of the radiation image storage panel shown in FIG. 5, the stimulating rays are applied onto the flat surfaces of the prismatic phosphor crystals 32 (top side of the storage panel) and the stimulated emission is detected on the support 31 side (bottom side of the storage panel). In this case, since the prismatic crystals 33 have flat ends (tops) 33c on the stimulating side, the stimulating rays are not scattered on the end (top) surfaces. Further, since the crystals 33 have convex ends (bottoms) 33a on the detecting side, the stimulated emission is not diffused at the bottom surfaces. Accordingly, not only the collecting efficiency of stimulated emission but also the incident efficiency of stimulating ray is so improved that high sensitivity and high image quality can be realized.

The process for preparing the radiation image storage panel of the invention is described below in the case where the phosphor is a stimulable phosphor.

The support employed in the invention can be optionally selected from those employed in the conventional radiation image storage panels. If the support is used as a substance for forming the phosphor layer by vapor deposition method, preferred supports are sheets of quartz glass, metals (e.g., aluminum, iron, tin, chromium) and resins (e.g., aramide). It is known that, for improving sensitivity or image quality (sharpness, graininess), a conventional radiation image storage panel may have a light-reflecting layer containing light-reflecting material such as titanium dioxide and/or a light-absorbing layer containing light-absorbing material such as carbon black. Also in the storage panel of the invention, these layers can be optionally provided. Further, for improving the sharpness of the resultant image, fine hollows or warts may be formed on the phosphor layer-side surface of the support (or on the phosphor layer-side surface of the auxiliary layer such as an undercoating layer (adhesive layer), the light-reflecting layer or the light-absorbing layer, if it is provided).

On the support, the phosphor layer is formed by vapor deposition method.

As the stimulable phosphor, a phosphor giving a stimulated emission in the wavelength region of 300 to 500 nm when it is irradiated with stimulating rays in the wavelength region of 400 to 900 nm is preferably employed.

A particularly preferred stimulable phosphor is an alkali metal halide phosphor having the following formula (I):

$$M^I X \cdot a M^{II} X'_2 \cdot b M^{III} X''_3 : z A \tag{I}$$

in which $M^I$ is at least one alkali metal element selected from the group consisting of Li, Na, K, Rb and Cs; $M^{II}$ is at least one alkaline earth metal element or divalent metal element selected from the group consisting of Be, Mg, Ca, Sr, Ba, Ni, Cu, Zn and Cd; $M^{III}$ is at least one rare earth element or trivalent metal element selected from the group consisting of Sc, Y, La, Ce, Pr, Nd, Pm, Sm, Eu, Gd, Tb, Dy, Ho, Er, Tm, Yb, Lu, Al, Ga and In; A is at least one rare earth element or metal element selected from the group consisting of Y, Ce, Pr, Nd, Sm, Eu, Gd, Tb, Dy, Ho, Er, Tm, Yb, Lu, Na, Mg, Cu, Ag, Tl and Bi; each of X, X' and X" independently is at least one halogen selected from the group consisting of F, Cl, Br and I; and a, b and z are numbers satisfying the conditions of $0 \leq a < 0.5$, $0 \leq b < 0.5$ and $0 \leq z < 0.2$, respectively.

In the formula (I), at least Cs is preferably included as $M^I$, at least Br is preferably included as X, and A is particularly preferably Eu or Bi. The phosphor of the formula (I) may contain a metal oxide (such as aluminum oxide, silicon dioxide or zirconium oxide) as an additives in an amount of not more than 0.5 mol based on 1 mol of $M^I$.

Another preferred stimulable phosphor is a rare earth activated alkaline earth metal fluoride-halide phosphor having the following formula (II):

$$M^{II}FX:zLn \qquad (II)$$

in which $M^{II}$ is at least one alkaline earth metal element selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), Ba is preferably included in an amount of half or more of $M^{II}$, and Ln particularly preferably is Eu or Ce. The $M^{II}FX$ in the formula (II) indicates the crystal structure of BaFX, and it by no means indicates F:X=1:1. The formula (II), therefore, does not indicate resultant stoichiometric composition. It is generally preferred to produce many $F^+(X^-)$ centers (which are vacant lattice points of $X^-$ ion) in a BaFX crystal, so as to enhance the efficiency of emission stimulated by light in the wavelength region of 600 to 700 nm. In many cases, F is in slight excess of X.

One or more of the following additives may be added into the phosphor of the formula (II), if needed, although they are omitted in the formula (II):

$$bA, wN^I, xN^{II}, yN^{III}$$

In the above formula, A is a metal oxide such as $Al_2O_3$, $SiO_2$ or $ZrO_2$. For preventing $M^{II}FX$ particles from sintering, A is preferably inactive to $M^{II}FX$ and is preferably in the form of fine particles (the mean size of primary particles is not more than 0.1 μm). $N^I$ is a compound of at least one alkali metal element selected from the group consisting of Li, Na, K, Rb and Cs; $N^{II}$ is a compound of alkaline earth metal element Mg and/or Be; and $N^{III}$ is a compound of at least one trivalent metal element selected from the group consisting of Al, Ga, In, Tl, Sc, Y, La, Gd and Lu.

The letters b, w, x and y represent added amounts of the additives, based on 1 mol of $M^{II}FX$ when the additives are added into the phosphor. They satisfy the conditions of $0 \leq b \leq 0.5$, $0 \leq w \leq 2$, $0 \leq x \leq 0.3$ and $0 \leq y \leq 0.3$. The amounts of the additives often decrease during sintering and washing processes, and hence the b, w, x and y do not always indicate the ratios of the components in the resultant phosphor. Some of the additives are not changed to remain in the resultant phosphor, but others are reacted with or incorporated in $M^{II}FX$.

Further, other additives can be added into the phosphor of the formula (II), if needed. Examples of the additives include Zn and Cd compounds; metal oxides such as $TiO_2$, BeO, MgO, CaO, SrO, BaO, ZnO, $Y_2O_3$, $La_2O_3$, $In_2O_3$, $GeO_2$, $SnO_2$, $Nb_2O_5$, $Ta_2O_5$ and $ThO_2$; Zr and Sc compounds; B compounds; As and Si compounds; tetrafluoroborates; hexafluoro compounds (monovalent or divalent salts or hexafluorosilicate, hexafluorotitanate and hexafluorozirconate); and compounds of transition metal such as V, Cr, Mn, Fe, Co and Ni. Further, whether the above additives are incorporated or not, any rare earth activated alkaline earth metal fluorohalide stimulable phosphor can be used in the invention.

The phosphor used in the invention is not restricted to a stimulable phosphor. A phosphor giving a spontaneous emission in the ultraviolet or visible wavelength region when it absorbs a radiation such as X-ray can be also employed in the invention. Examples of these phosphors include $LnTaO_4$:(Nb,Gd), $Ln_2SiO_5$:Ce, LnOX:Tm (where Ln is a rare earth element), CsX (where X is a halogen), $Gd_2O_2S$:Tb, $Gd_2O_2S$:Pr,Ce, $ZnWO_4$, $LuAlO_3$:Ce, $Gd_3Ga_5O_{12}$:Cr,Ce and $HfO_2$.

In the present invention, the phosphor layer can be formed by electron beam-evaporating method, which is a kind of vapor deposition method. The electron beam-evaporating method gives regularly aligned prismatic crystals having good shape. Further, since the vapor source is locally heated and instantly vaporized, the composition of the resultant phosphor in the layer is usually almost the same as that of the phosphor of the vapor source. In contrast, in other vapor deposition methods, since a component having a high vapor pressure is preferentially vaporized (for example, an activator is vaporized prior to the phosphor matrix components), the composition of the resultant phosphor may be not coincident with that of the phosphor of the vapor source.

In the first place, a stimulable phosphor of vapor source and a substrate on which the vapor is to be deposited are set in an vapor-deposition apparatus. The apparatus is then evacuated to give a pressure of $3 \times 10^{-10}$ to $3 \times 10^{-12}$ kg/cm$^2$. The substrate is placed perpendicularly to the direction in which the vapor comes out of the source. Inert gases such as Ar and Ne may be introduced into the apparatus while the vacuum is kept in the above range.

The stimulable phosphor is preferably compressed to form a pellet. The pressure of compressing is generally in the range of 800 to 1,000 kg/cm$^2$. The phosphor may be heated in the range of 50 to 200° C. during the compressing process, and after the compression is complete, the obtained pellet may be degassed. By the compressing process, the relative density of the vapor source can be increased. If the vapor source has a low relative density, the phosphor is often so non-uniformly vaporized that the deposited film has an uneven thickness, that bumped substances deposit on the substrate or that the activators or additives of the phosphor are segregated in the deposited film. In place of the stimulable phosphor, a mixture of starting materials for the formation of the stimulable phosphor can be used as the vapor source.

In the second place, an electron beam generated by an electron gun is applied onto the vapor source. The accelerating voltage of electron beam is preferably in the range of 1.5 kV to 5.0 kV. If it is less than 1.5 kV, the voltage is so unstable that the beam position drifts. Further, since the surface of vapor source scanned by the electron beam is deformed, the vaporizing surface can not be kept flat. If the accelerating voltage is higher than 5.0 kV, the prismatic phosphor crystals grow unevenly in a gas phase by vaporization.

By applying the electron beam, the stimulable phosphor of vapor source is heated, scattered and deposited on the substrate. The deposition rate of the phosphor is generally in the range of 0.1 to 1,000 μm/minute, preferably in the range of 1 to 100 μm/minute. Just before the step of completing the vapor-deposition process, the power of the electron beam is gradually lowered so as to make desired convex ends of grown prismatic crystals.

The electron beam may be applied twice or more to form two or more phosphor layers. Further, two or more kinds of phosphors may be co-deposited by means of plural electron guns. It is also possible that the phosphor layer be formed on the substrate simultaneously with synthesizing the phosphor from materials. The substrate may be cooled or heated, if needed, during the deposition process, or may be subjected to heat treatment (annealing treatment) after the deposition process is complete.

The vapor-deposition method used in the invention is not restricted to the electron beam-evaporating method, and various other methods such as resistance-heating method and spattering method can be used.

In the above-described manner, the phosphor layer in which the prismatic stimulable phosphor crystals are aligned almost perpendicularly to the substrate (support) as shown in FIG. 1 can be formed. Thus formed phosphor layer comprises only the stimulable phosphor with no binder, and there are cracks among the prismatic crystals.

The phosphor layer in which the prismatic crystals are obliquely aligned (as shown in FIG. 4) can be also formed in the process of electron beam-evaporating by placing the substrate at an angle of 0° to 45° (e.g., at 45°) with the direction perpendicular to the direction along which the vapor comes.

For forming the phosphor layer having the constitution shown in FIG. 5, a phosphor layer is first formed in a vapor phase on a substrate (such as a glass plate, a metal plate or a plastic sheet) from a stimulable phosphor in the above manner. The formed phosphor layer is then peeled off from the substrate, and reversely placed on a transparent support with an adhesive. Materials of the transparent support can be selected independently from the condition of vapor deposition, and are determined in consideration of mechanical and optical characters according to the use of the storage panel. Preferred examples of the transparent supports include a quartz glass sheet and a resin sheet such as polyethylene terephthalate sheet.

It is preferred to provide a protective film on the surface of phosphor layer, so as to ensure good handling of the radiation image storage panel in transportation and to avoid deterioration. The protective film is preferably transparent. Further, for protecting the panel from chemical deterioration and physical damage, the protective film must be chemically stable, of high moisture proof and physically strong.

The protective film can be provided by coating the stimulable phosphor layer with a solution in which a transparent organic polymer (e.g., cellulose derivatives, polymethyl methacrylate, fluororesins soluble in organic solvents) is dissolved in a proper solvent, by placing a beforehand prepared sheet for the protective film (e.g., a film of organic polymer such as polyethylene terephthalate, a transparent glass plate) on the phosphor layer with an adhesive, or by depositing vapor of inorganic compounds on the phosphor layer.

Various additives may be dispersed in the protective film. Examples of the additives include light-scattering fine particles (e.g., particles of magnesium oxide, zinc oxide, titanium dioxide and alumina), a slipping agent (e.g., powders of perfluoroolefin resin and silicone resin) and a crosslinking agent (e.g., polyisocyanate). The thickness of the protective film is generally in the range of about 0.1 to 20 μm (if the film is made of polymer material) or in the range of about 100 to 1,000 μm (if the film is made of an inorganic compound such as glass). For enhancing the resistance to stain, a fluororesin layer is preferably provided on the protective film. The fluororesin layer can be form by coating the surface of the protective film with a solution in which a fluororesin is dissolved or dispersed in an organic solvent, and drying the coated solution. The fluororesin may be used singly, but a mixture of the fluororesin and a film-forming resin can be employed. In the mixture, an oligomer having polysiloxane structure or perfluoroalkyl group can be further added. In the fluororesin layer, fine particle filler may be incorporated so as to reduce blotches caused by interference and to improve the quality of the resultant image. The thickness of the fluororesin layer is generally in the range of 0.5 to 20 μm. In forming the fluororesin layer, additives such as a crosslinking agent, a film-hardening agent and an anti-yellowing agent can be used. In particular, the crosslinking agent is advantageously employed to improve durability of the fluororesin layer.

Thus, the radiation image storage panel of the invention can be prepared. The storage panel of the invention may have known various structures. For example, in order to improve the sharpness of the resultant image, at least one of the layers may be colored with a colorant which does not absorb the stimulated emission but the stimulating rays.

The process of the invention for reading radiation image information stored in the above-described radiation image storage panel is explained below by referring to the attached drawings.

Figure 6:
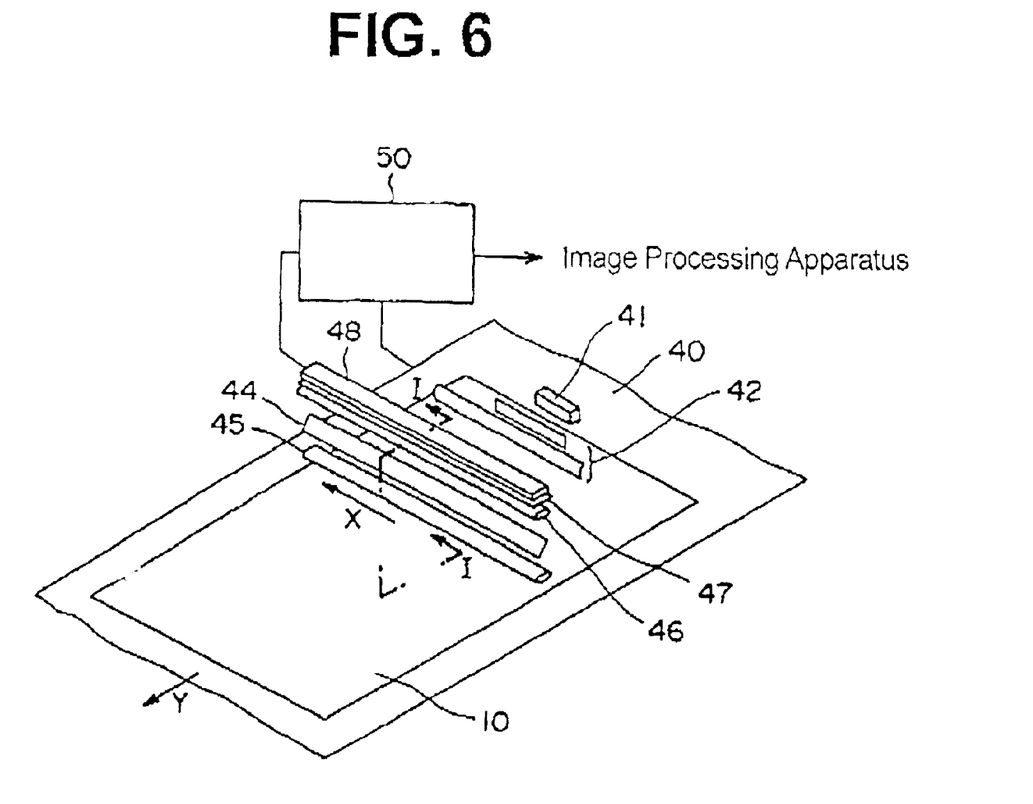
FIG. 6 is a sketch showing a radiation image information-reading apparatus for performing the process of the invention.
Figure 7:
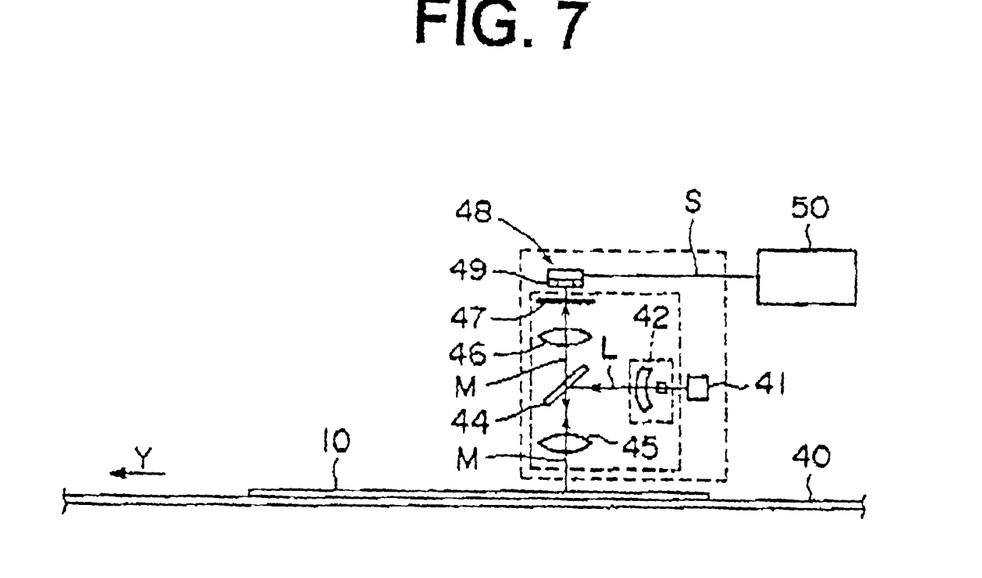
FIG. 7 is a sectional view of the apparatus shown in FIG. 6 taken along the I—I line.

FIG. 6 is a sketch showing a radiation image information-reading apparatus for performing the process of the invention. FIG. 7 is a sectional view of the apparatus of FIG. 6 taken along the I—I line.

In FIGS. 6 and 7, a radiation image storage panel 10 comprises a support 11 and a phosphor layer 12 in which many prismatic phosphor crystals 13 having convex ends 13a are perpendicularly aligned (as shown in FIG. 1). The storage panel 10 is beforehand exposed to radiation (such as X-rays) having passed through an object, and hence radiation image information of the object is recorded and stored in the storage panel 10. In consideration of storing efficiency of the radiation energy, the radiation such as X-rays are preferably applied almost perpendicularly to the storage panel 10 so that the incident direction may be parallel to the aligning direction of the prismatic phosphor crystals 13. The storage panel 10 is placed on the transferring belt 40 so that the phosphor layer 12 would be placed upside. The transferring belt 40 moves in the direction shown by an arrow Y, and thereby the storage panel 10 is transferred. The transferring speed of the storage panel 10 is identical with the moving speed of the belt 40, which is input into an image-reading means 50.

A broad area laser (hereinafter referred to as BLD) 41 linearly emits stimulating light L almost parallel to the surface of the panel 10. The stimulating light L passes through an optical system 42 comprising a collimator lens and a toric lens, and is thereby converted into parallel rays. The rays are then reflected by a dichroic mirror 44 placed at an angle of 45° to the panel 10. The dichroic mirror 44 reflects the stimulating rays, but transmits the stimulated emission. The rays reflected by the mirror 44 then advance perpendicularly to the panel 10, and pass through a distributed index lens array (an array of many distributed index lenses, hereinafter referred to as 'first SELFOC lens array) 45 to be focused on the panel 10 linearly along the direction shown by an arrow X.

The linearly focused stimulating rays L are perpendicularly applied to the storage panel 10, and thereby a stimulated emission M emits from the focused area and from the adjacent area. The emission M has an intensity according to the stored radiation image information. Since the phosphor layer 12 of the storage panel 10 comprises prismatic crystals 13 having spherical ends 13*a*, most of the stimulated emission M comes out perpendicularly or almost perpendicularly from the surface of the phosphor layer 12 of the storage panel 10.

The stimulated emission M is converted into parallel rays through the first SELFOC lens array 45, and pass through the dichroic mirror 44. The rays M then pass through a second SELFOC lens array 46, and are thereby focused on photo-receiving faces of photoelectric converting elements 49 constituting a line sensor 48 placed just above the area on which the stimulating rays are focused. The line sensor 48 comprises many photoelectric converting elements 49 regularly arrayed in a line having at least the length of the area linearly exposed to the stimulating rays, and each element corresponds to one pixel. Since the line sensor 48 is placed right above the area on which the stimulating rays L are focused, the stimulated emission which almost perpendicularly comes can be efficiently collected. Further, the photo-receiving faces of the converting elements 49 are so small that the light-collecting efficiency is remarkably improved.

The stimulated emission M having passed through the second SELFOC lens array 46 is slightly contaminated with the stimulating rays L reflected by the surface of the panel 10, and hence the contaminating rays L are cut off with a stimulating ray-cutting filter 47. The filter 47 does not transmit the stimulating rays L but the stimulated emission M.

The stimulated emission M received by the converting elements 49 is photoelectrically converted into signals S, which are then input into the image-reading means 50. In the image-reading means 50, the signals S are processed on the basis of the moving speed of the transferring belt 40 to obtain image data according to the positions of the panel 10. Thus obtained image data are output on an image-processing apparatus (not shown).

The radiation image information-reading apparatus used in the invention is not restricted to the embodiment shown in FIGS. 6 and 7. Each part of the apparatus (such as the light source, the light-collecting optical system between the light source and the storage panel, the line sensor, the optical system between the storage panel and the line sensor) may have various known constitution.

In the above-described embodiment, since the prismatic phosphor crystals in the radiation image storage panel are aligned perpendicularly, the optical systems are designed so that the stimulating rays and the stimulated emission may be enter and come out, respectively, perpendicularly to the panel. However, it is not necessary that the optical systems be set strictly parallel to the aligning direction of the prismatic crystals. Further, in the case where the aligning direction of the prismatic crystals is inclined at a certain angle, the optical systems may be set so that the stimulating rays and the stimulated emission may be enter and come out, respectively, parallel or almost parallel to the inclined aligning direction.

As the line light source, a light source having a linear shape may be used. Further, a fluorescent lamp, a cold cathode fluorescent lamp and a LED (light-emitting diode) array can be also used. The line light source may emit stimulating light either continuously or intermittently in the form of pulses. For reducing possible noises, the stimulating light is preferably in the form of pulses with high power.

Examples of the line sensors include an amorphous silicon sensor, a CCD sensor, a CCD with back illuminator and MOS image sensor. The line sensor may consist of two or three rows of photoelectric converting elements, as well as a single row of the elements.

The radiation image storage panel is preferably transferred almost perpendicularly to the longitudinal direction of the line light source and the line sensor. However, as long as almost all of the surface of the panel is evenly exposed to the stimulating rays, the panel may be transferred diagonally or in zigzag.

In the above embodiment, the optical system between the storage panel and the line sensor is designed to form an image isometrically for simplifying the explanation. However, a magnifying or reducing optical system may be used. For increasing the light-collecting efficiency, the use of an isometrical or magnifying optical system is preferred.

Further, in the above embodiment, the optical path of the stimulating rays L and the stimulated emission M is partly overlapped to reduce the volume of the apparatus. However, the path of the stimulating rays L may be completely different from that of the emission M.

Furthermore, in the above embodiment, the radiation image information is read out while the radiation image storage panel is transferred. However, the information may be read out while not the storage panel but the line sensor is moved along the surface of the panel, or while both are moved to change their relative positions.

An image-processing apparatus, in which image data signals output from the radiation image information-reading means are subjected to various signal processing, may be installed. Further, an erasing means, in which radiation energy remaining in the panel after reading is adequately released, may be installed.

Figure 8:
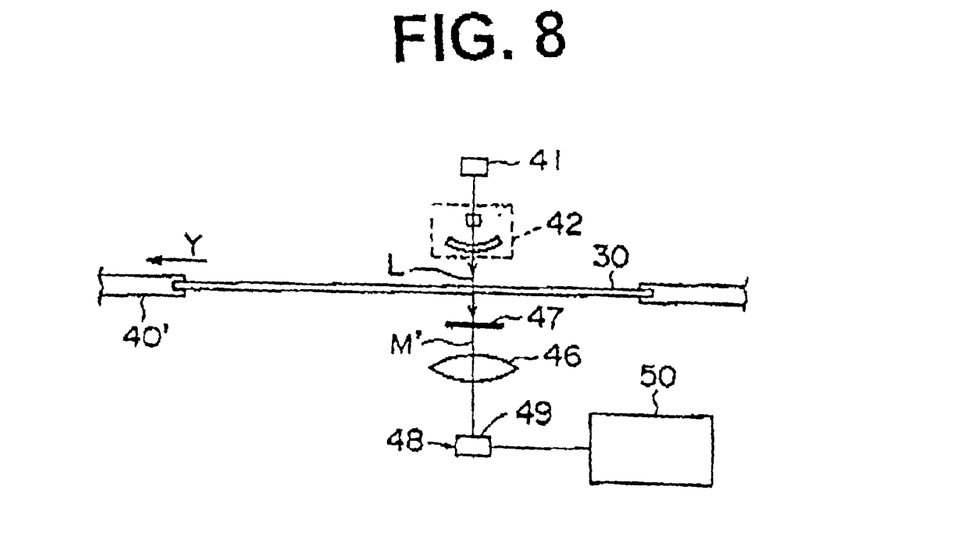
FIG. 8 is a sketch showing another radiation image information-reading apparatus for performing the process of the invention.
Figure 9:
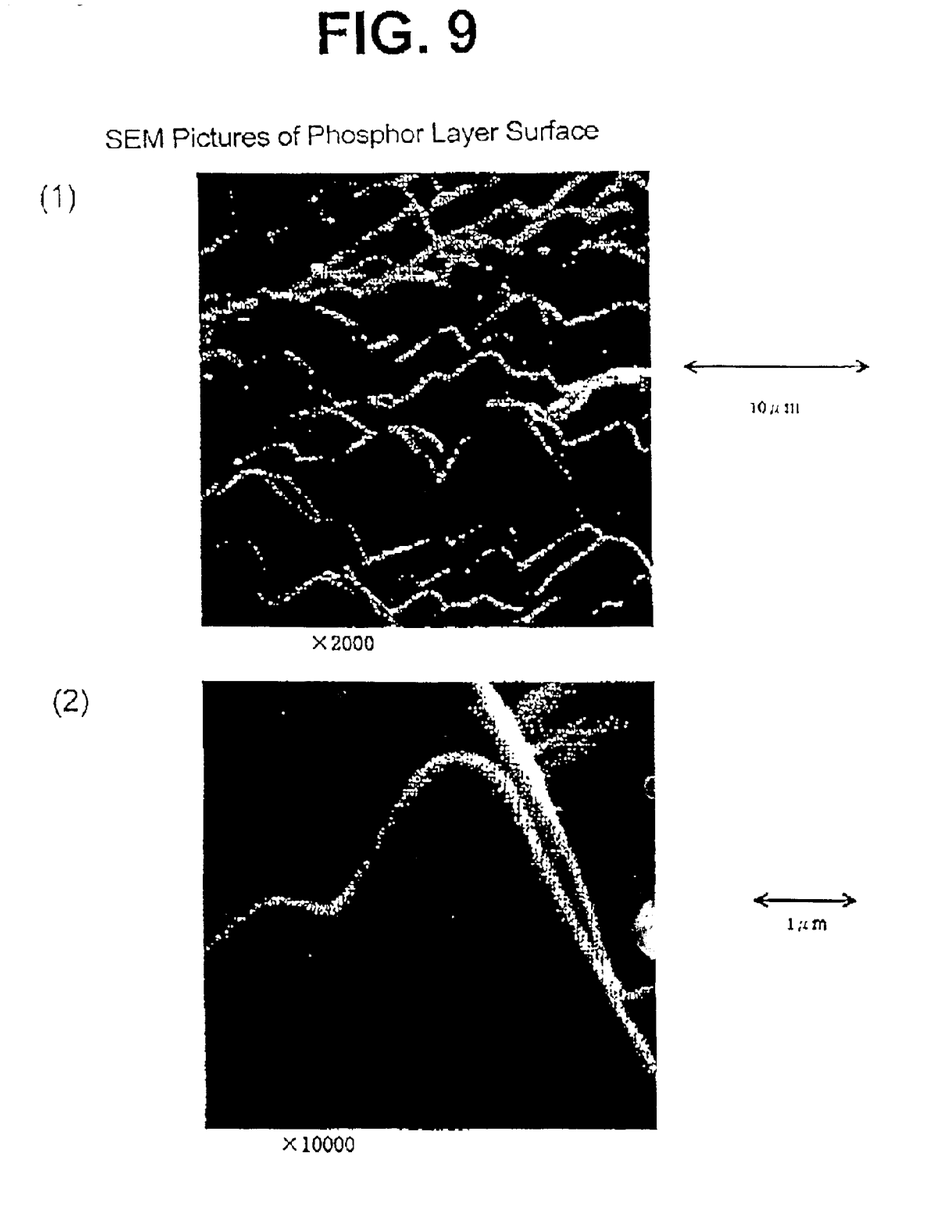

FIG. 8 shows an alternative radiation image information-reading apparatus for performing the process of the invention. In FIG. 8, a radiation image storage panel 30 comprises a transparent support 31 and a phosphor layer 32 in which many prismatic phosphor crystals 33 having convex ends 33*a* are perpendicularly aligned (as shown in FIG. 5). The storage panel 30 is beforehand exposed to radiation (such as X-rays) having passed through an object, and hence radiation image information of the object is recorded and stored in the panel 30. The panel 30 is placed on a transferring belt 40' so that the phosphor layer 32 may take a upside position. The transferring belt 40' moves in the direction shown by an arrow Y, and thereby the panel 30 is transferred. The transferring speed of the panel 30 is identical with the moving speed of the belt 40', which is input into an image-reading means 50.

A BLD 41 linearly emits stimulating rays L almost perpendicularly to the surface of the panel 30. The stimulating rays L pass through an optical system 42 comprising a collimator lens and a toric lens, and are thereby made to advance perpendicularly to the surface of the storage panel 30 and focused on the panel 30 linearly along the direction shown by an arrow X.

The linearly focused stimulating rays L are perpendicularly applied onto the storage panel 30, and thereby a stimulated emission is emitted from the focused area and from the adjacent area. At the same time, the stimulated emission M' also comes out from the reverse (bottom) surface of the panel 30 through the transparent support 31.

The emission M' has an intensity according to the stored radiation image information. Since the phosphor layer 32 comprises prismatic crystals 33 having spherical ends 33a, most of the stimulated emission M' comes perpendicularly or almost perpendicularly from the reverse surface of the phosphor layer 32 (from the reverse surface of the transparent support 31).

The stimulated emission M' pass through a SELFOC lens array 46, and are thereby focused on photo-receiving faces of photoelectric converting elements 49 constituting a line sensor 48 placed just below the area on which the stimulating rays are focused.

The stimulated emission M' having passed through the SELFOC lens array 46 is slightly contaminated with the stimulating rays L passing through the panel 30, and hence the contaminating rays L are cut off with a stimulating ray-cutting filter 47.

The stimulated emission M' received by the converting elements 49 is photoelectrically converted into signals S, which are then input into the image-reading means 50. In the image-reading means 50, the signals S are processed on the basis of the moving speed of the transferring belt 40' to obtain image data according to the positions of the panel 30. Thus obtained image data are output on an image-processing apparatus (not shown).

In the present invention, since the prismatic phosphor crystals aligned in a certain direction have convex ends on the side from which the stimulated emission is detected, the emission is prevented from scattering when it comes out of the ends. Consequently, an increased amount of the emission comes out almost parallel to the aligning direction, and hence a radiation image storage panel in which the sensitivity and the emission-collecting efficiency are both improved is obtained. Further, if the crystals have convex ends on the support side (the side from which the stimulated emission is detected) and flat ends on the phosphor layer surface (the side onto which the stimulating rays are applied), the emission-collecting efficiency and the stimulating rays-applying efficiency are both so improved that the panel giving an image of particularly high quality with remarkably improved sensitivity can be obtained.

In the process of the invention, the stimulating rays are applied almost parallel to the aligning direction of the prismatic phosphor crystals in the radiation image storage panel described above, and the stimulated emission is received by the line sensor placed on the side of the convex ends and approximately on an extended line of the aligning direction. The stimulating rays are, therefore, efficiently applied onto the prismatic crystals in the phosphor layer, and an increased amount of the stimulated emission coming out of the convex ends parallel to the aligning direction is efficiently received. Accordingly, the image information can be rapidly read out, and a radiation image of high quality can be reproduced in high sensitivity. The radiation image storage panel and the process of the invention is advantageously used particularly in radiography for medical diagnosis, industrial radiography and fluoroscopy.

EXAMPLE 1

(1) Preparation of Vapor Source

In a mortar, 100 g of cesium bromide (CsBr, 0.47 mol) and 1.8404 g of europium bromide ($EuBr_3$, $4.7\times10^{-3}$ mol) were pulverized and mixed. The mixture was further stirred and mixed for 15 minutes by a stirring shaker, and placed in a furnace. The furnace was evacuated for 3 minutes, and then the mixture was fired at 525° C. for 2 hours under nitrogen gas atmosphere. After the firing was complete, the furnace was evacuated for 15 minutes to cool the product. Thus prepared europium activated cesium bromide (CsBr:0.01Eu) was pulverized in a mortar, and compressed at 800 kg/cm² to form a pellet for vapor source. The pellet was evacuated and degassed at 150° C. for 2 hours.

(2) Formation of Phosphor Layer

The above vapor source was placed at a predetermined position in a vapor-deposition apparatus, and an aluminum support was set at another predetermined position so that it might be perpendicular to the direction in which the vapor comes out of the source. After the apparatus was evacuated to $4.0\times10^{-9}$ kg/cm², an electron beam from an electron gun (accelerating voltage: 4.0 kV, 60 W) was applied onto the vapor source so as to deposit the stimulable phosphor on the support at a rate of 25 µm/min. The power of the electron beam was then gradually lowered to 0 for 3 minutes. After the inner pressure was returned to atmospheric pressure, the support was taken out of the apparatus. On thus-treated support, a deposited layer (thickness: 200 µm) consisting of prismatic phosphor crystals (each crystal having the width of approx. 8 µm and the length of approx. 200 µm) aligned thickly and perpendicularly was formed. The surface of the deposited layer was observed with an electron microscope (SEM) to obtain the micrographs shown in FIG. 9 (1) and (2), which indicated that the prismatic crystals had spherical ends on the growing side.

What is claimed is:

1. A radiation image storage panel comprising a support sheet and a phosphor layer formed on a surface of the support sheet by vapor-accumulating method, wherein the phosphor layer comprises prismatic crystals of phosphor aligned in the same direction, and each of the crystals has a convex surface at one end.

2. The radiation image storage panel of claim 1, wherein the phosphor is stimulable phosphor.

3. The radiation image storage panel of claim 2, wherein the crystal has a convex surface at the end not facing the surface of the support.

4. The radiation image storage panel of claim 2, wherein the support is a transparent support, and the crystal has a convex surface at the end facing the surface of the support.

5. The radiation image storage panel of claim 1, wherein the convex surface is a spherical surface.

6. The radiation image storage panel of claim 1, wherein the prismatic crystals of phosphor are aligned perpendicularly to the surface of the support.

7. A process for preparing a radiation image storage panel of claim 3, comprising applying electron beams to a stimulable phosphor source to vaporize the phosphor source and depositing the vapor of the phosphor source on the surface of the support, in which the electron beams are gradually reduced in their energy just before the deposition is complete.

8. A process for reading radiation image information comprising the steps of:

moving in one direction the radiation image storage panel of claim 3 on which radiation image information is recorded and stored, in relation to a line sensor which comprises plural photoelectric converting elements arranged linearly and which is placed over the convex surfaces of the aligned prismatic phosphors of the storage panel on a line extending from the end of the convex surface of the aligned prismatic crystal in the same direction, under such condition that the line sensor moves on a plane parallel to the storage panel, while the phosphor layer of the storage panel is scanned with stimulating rays in a direction which is different from the direction of the movement of the storage panel and the stimulating lays are applied onto the phosphor layer approximately parallel to the aligning direction of the prismatic phosphor crystals in the phosphor layer;

detecting an emission emitting from the phosphor layer of the storage panel by the line sensor, so as to photo-electrically convert the emission to an electric signal;

detecting an electric signal of the movement of the storage panel in relation to the line sensor; and comparing the signal of the emission and the signal of the movement of the storage panel to produce a radiation image information in the form of electric signals.

9. The process of claim 8, wherein the prismatic crystals of phosphor in the phosphor layer of the radiation image storage panel are aligned perpendicularly to the surface of the support.

10. A process for reading radiation image information, comprising the steps of:

moving in one direction the radiation image storage panel of claim 4 on which radiation image information is recorded and stored, in relation to a line sensor which comprises plural photoelectric converting elements arranged linearly and which is placed below the support of the storage panel on a line extending from the end of the convex surface of the aligned prismatic crystal in the same direction, under such condition that the line sensor moves on a plane parallel to the storage panel, while the phosphor layer of the storage panel is scanned with stimulating rays in a direction which is different from the direction of the movement of the storage panel and the stimulating lays are applied onto the phosphor layer approximately parallel to the aligning direction of the prismatic phosphor crystals in the phosphor layer;

detecting an emission emitting from the phosphor layer of the storage panel by the line sensor, so as to photo-electrically convert the emission to an electric signal;

detecting an electric signal of the movement of the storage panel in relation to the line sensor; and comparing the signal of the emission and the signal of the movement of the storage panel to produce a radiation image information in the form of electric signals.

11. The process of claim 10, wherein the prismatic crystals of phosphor in the phosphor layer of the radiation image storage panel are aligned perpendicularly to the surface of the support.

* * * * *